United States Patent [19]
Bryan

[11] Patent Number: 5,141,701
[45] Date of Patent: * Aug. 25, 1992

[54] BOTTOM NOZZLE TO LOWER GRID ATTACHMENT

[75] Inventor: William J. Bryan, Granby, Conn.

[73] Assignee: Combustion Engineering, Inc., Windsor, Conn.

[*] Notice: The portion of the term of this patent subsequent to Feb. 26, 2008 has been disclaimed.

[21] Appl. No.: 582,589

[22] Filed: Sep. 14, 1990

[51] Int. Cl.$^5$ .............................................. G21C 15/00
[52] U.S. Cl. .................................... 376/364; 376/438; 376/362; 376/446
[58] Field of Search ............... 376/364, 438, 446, 362, 376/441

[56] References Cited

U.S. PATENT DOCUMENTS

| | | | |
|---|---|---|---|
| 3,769,158 | 10/1973 | Winders | 376/451 |
| 4,076,586 | 2/1978 | Bideau et al. | 376/364 |
| 4,134,790 | 1/1979 | Bevilacqua et al. | 376/364 |
| 4,391,771 | 7/1983 | Anthony | 376/451 |
| 4,996,021 | 2/1991 | Bryan | 376/446 |

Primary Examiner—Brooks H. Hunt
Assistant Examiner—Meena Chelliah
Attorney, Agent, or Firm—John H. Mulholland

[57] ABSTRACT

Bottom end fuel assembly reconstitution is permitted by elimination of weld of Inconel lower grid perimeter strip to stainless steel lower end fitting. Slots in 2 or 3 sides of L.E. Fitting capture ribbed sections of grid perimeter strip, locking screws hold L.E. Fitting in position on guide thimbles. Grids lip on perimeter strip is interlocked by sliding in L.E. Fitting groove.

3 Claims, 10 Drawing Sheets

BOTTOM NOZZLE TO LOWER GRID ATTACHMENT

BACKGROUND OF THE INVENTION

U.S. Pat. No. 3,791,466 "Low Parasitic Capture Fuel Assembly Structure" describes many methods of attaching nuclear fuel assembly grids to the assembly's guide thimble or guide tube structure.

In the past it has been common to weld Inconel lower grids to the Stainless Steel lower end fittings by use of the Inconel lower grid's perimeter strip. Other Zircaloy grids are attached to the guide tubes by welding of their strips directly to the Zircaloy guide tubes.

Today, certain European countries require that fuel assemblies be reconstitutable from the bottom of the fuel assembly. This in turn requires that the attachment of the lower grid to the bottom nozzle be removable. Thus making welding of the lower grid to the lower end fitting an unattractive method of attachment because welds must first be broken before the lower end fitting can be removed for assembly reconstitution. To eliminate this condition, it is deemed desirable to have attachments which can secure the lower grid to the lower end fitting while allowing it to be removed and reattached.

SUMMARY OF THE INVENTION

The novel attachments of the invention consists of a lower end fitting or bottom nozzle which has been slotted along its length on two opposite or three sides. The lower grid's perimeter strips are captured by the lower end fitting slots by making use of a bend or rib in the strip. Bends or ribs are located on two opposing strips, or three strips, respectively. Attachment 10 is shown in FIGS. 1-4 and attachment 20 in FIGS. 5-8.

Other attachments of the invention (30 of FIGS. 9-12 and 40 of FIGS. 13-16) use a similar grooved lower end fitting with the grooves or mating cutouts on all four sides. The lower grid's perimeter strips are used as springs to snap connect strip retaining features into the groove or cutouts. In addition, screws (FIGS. 19-22) can be used to hold the lower grid perimeter strip against the lower end fitting increasing the strength of the snap connection.

DETAILED DESCRIPTION OF THE INVENTION

Figure 1:
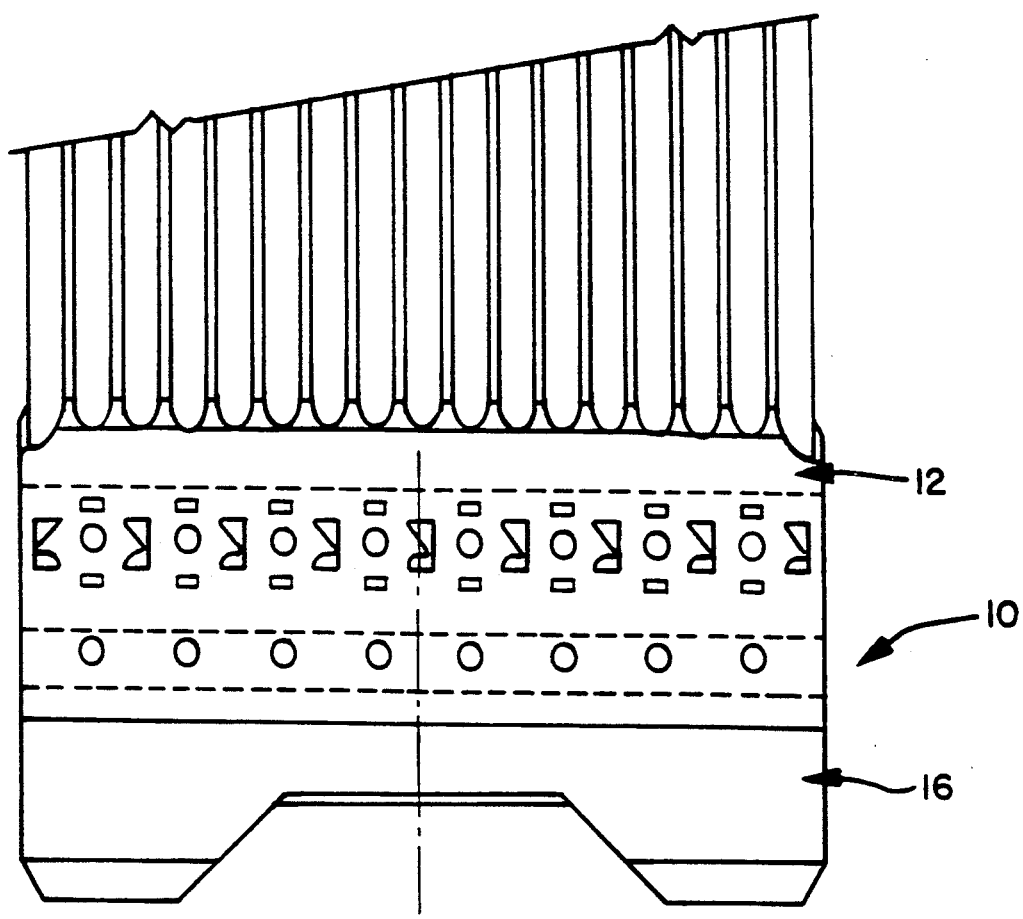
FIG. 1 is a schematic partial elevational view of a pressurized water nuclear reactor fuel assembly lower grid and lower end fitting having a sliding attachment.
Figure 2:
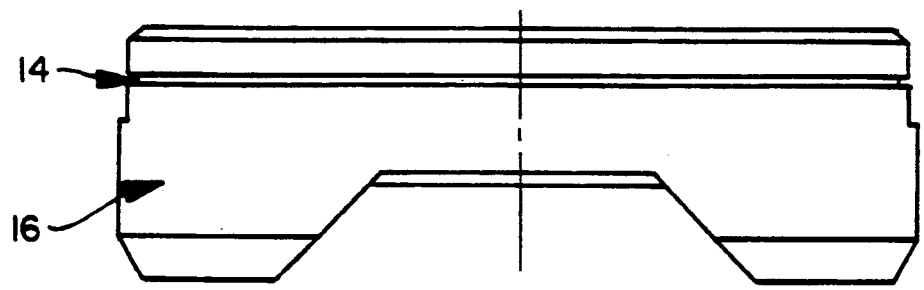
FIG. 2 is the lower end fitting of FIG. 1.
Figure 3:
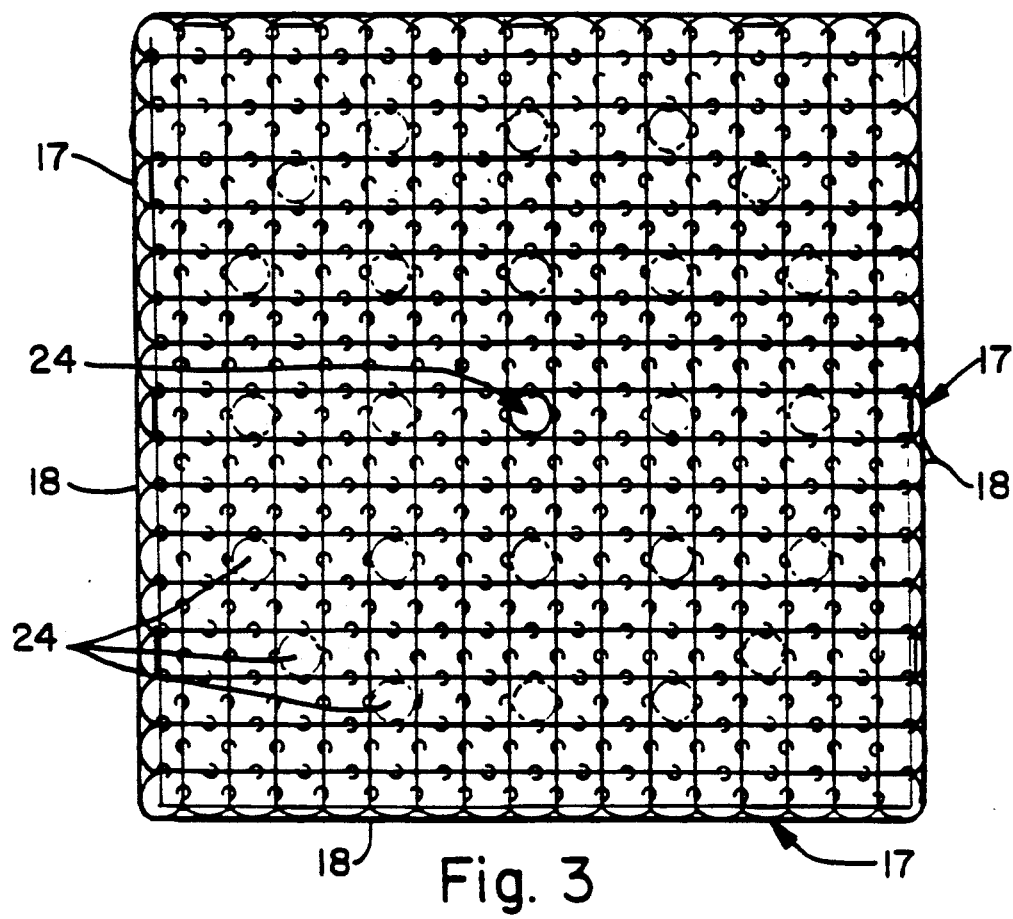
FIG. 3 is a plan view of the grid of FIG. 1.
Figure 4:
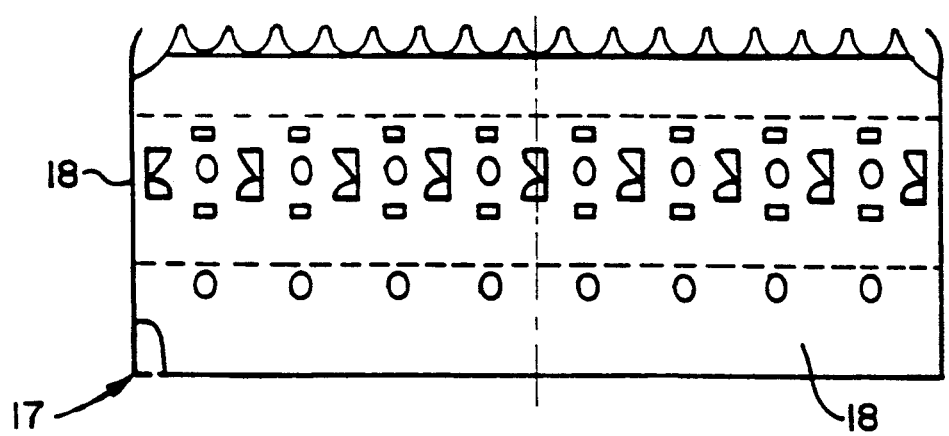
FIG. 4 is an elevational view with part broken away of the grid of FIG. 1.
Figure 5:
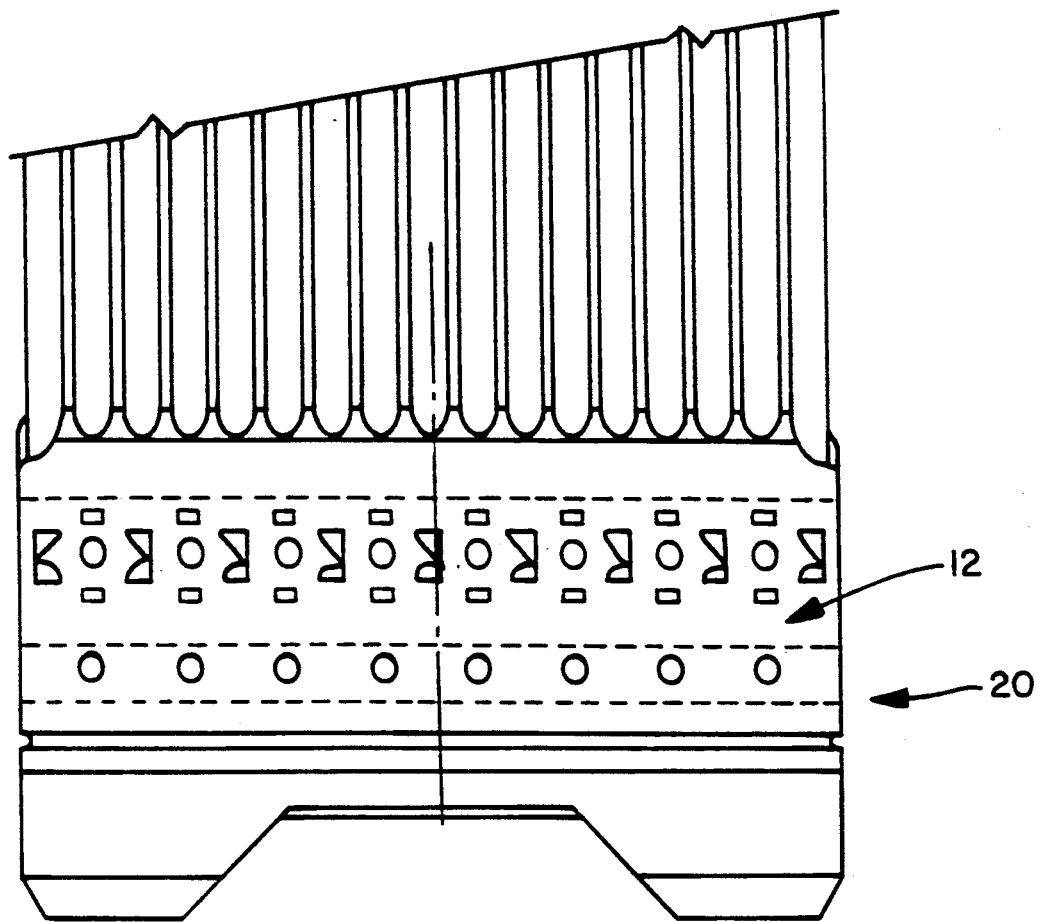
FIG. 5 is a view similar to FIG. 1 of another sliding embodiment.
Figure 6:
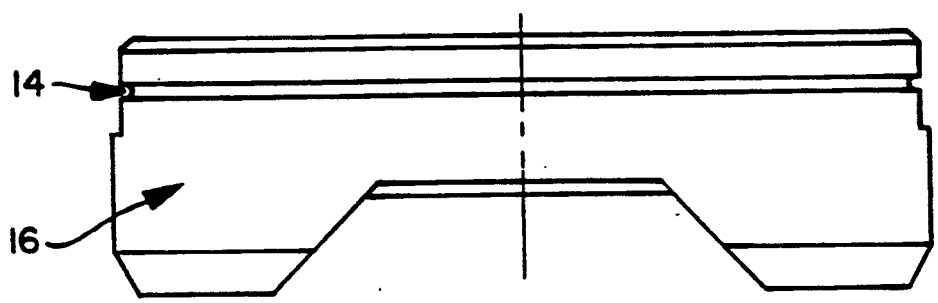
FIG. 6 is a view similar to FIG. 2 of the FIG. 5 embodiment.
Figure 7:
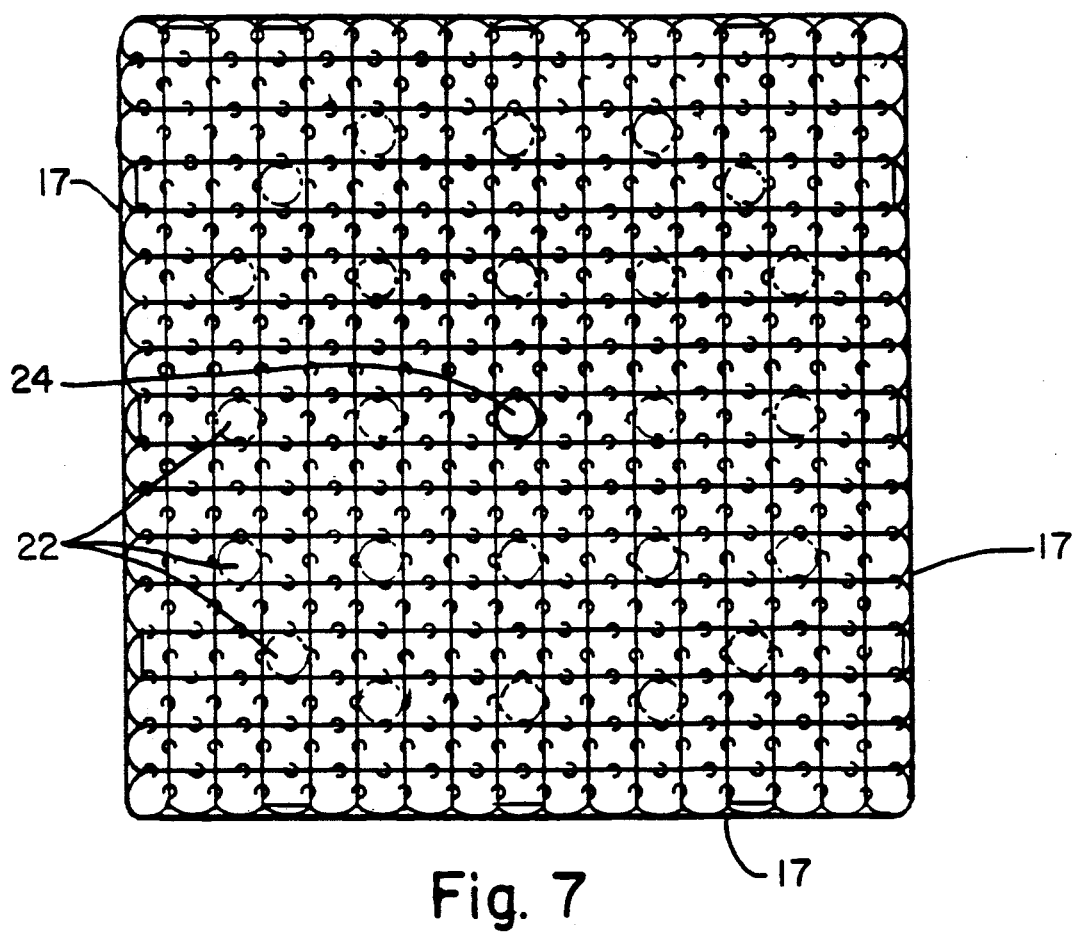
FIG. 7 is a view similar to FIG. 3 of the FIG. 5 embodiment.
Figure 8:
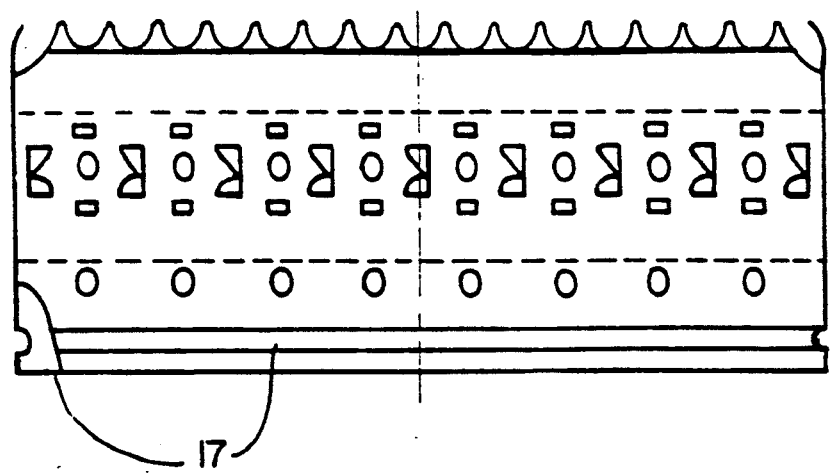
FIG. 8 is a view similar to FIG. 4 of the FIG. 5 embodiment.
Figure 9:
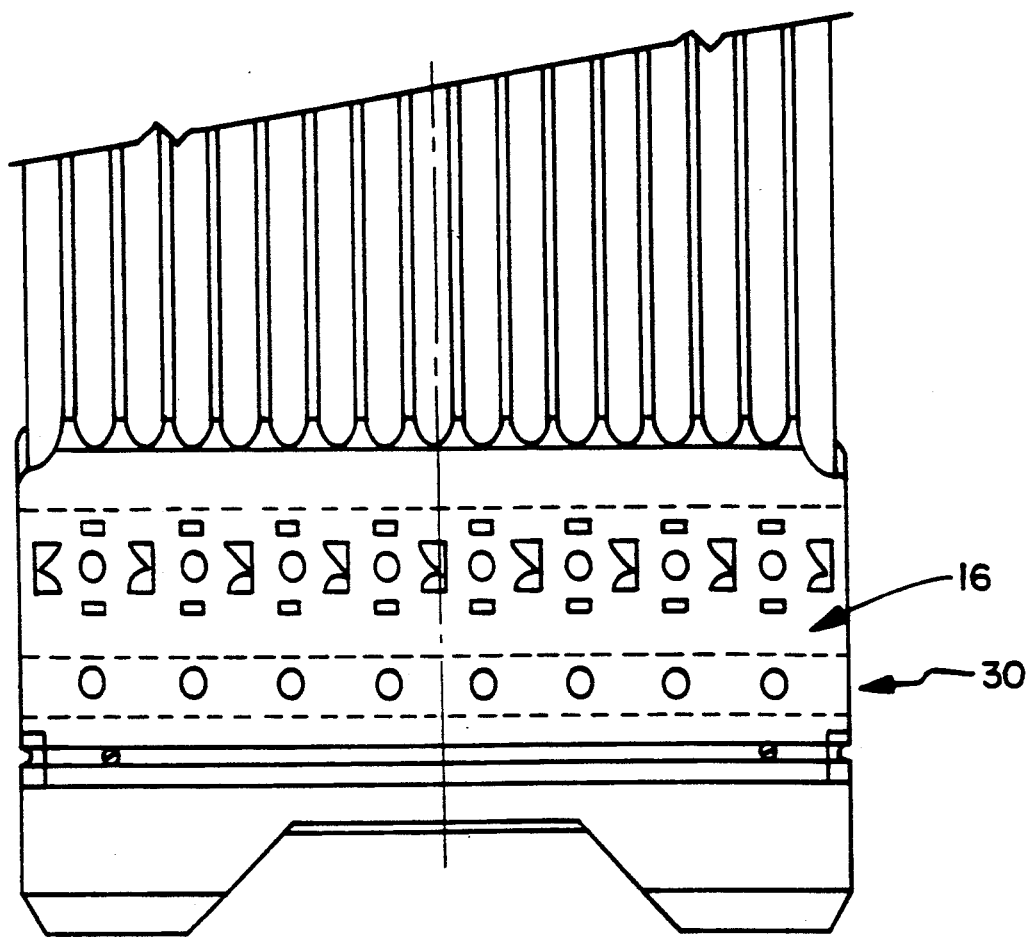
FIGS. 9-16 correspond to FIGS. 1-8 showing snapping attachments instead of sliding attachments and optional locking screws.
Figure 10:
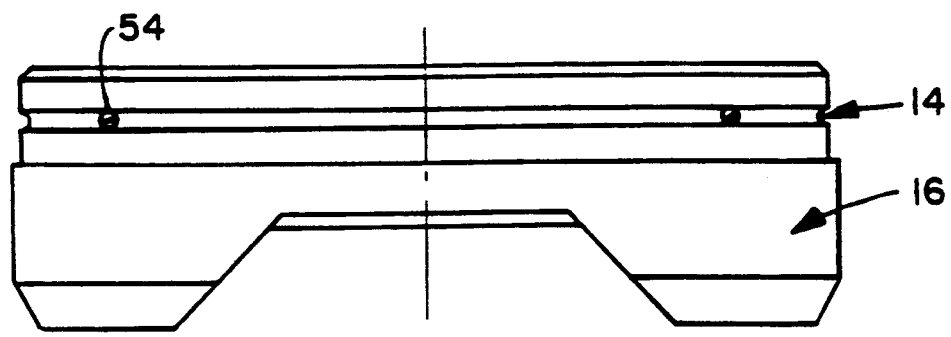
Figure 11:
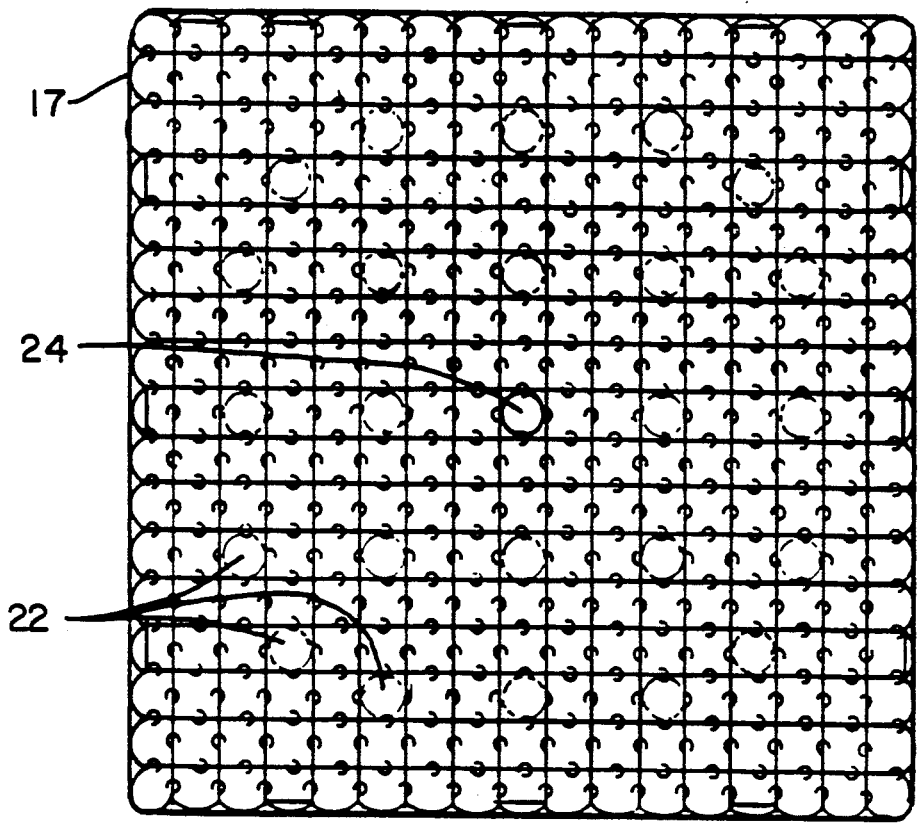
Figure 12:
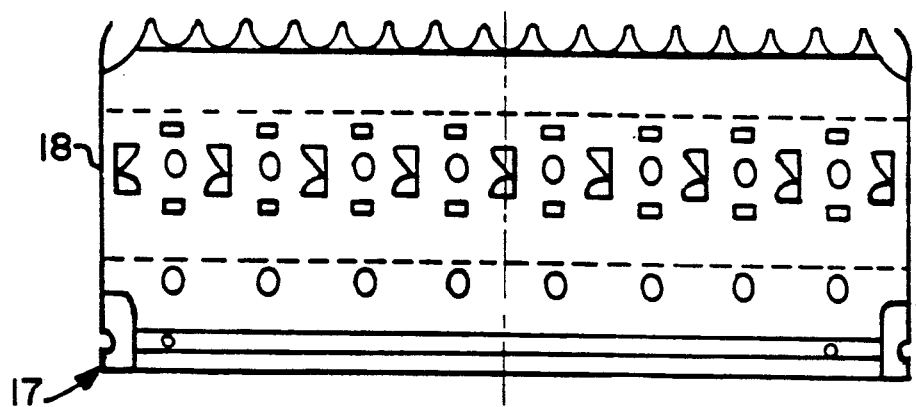
Figure 13:
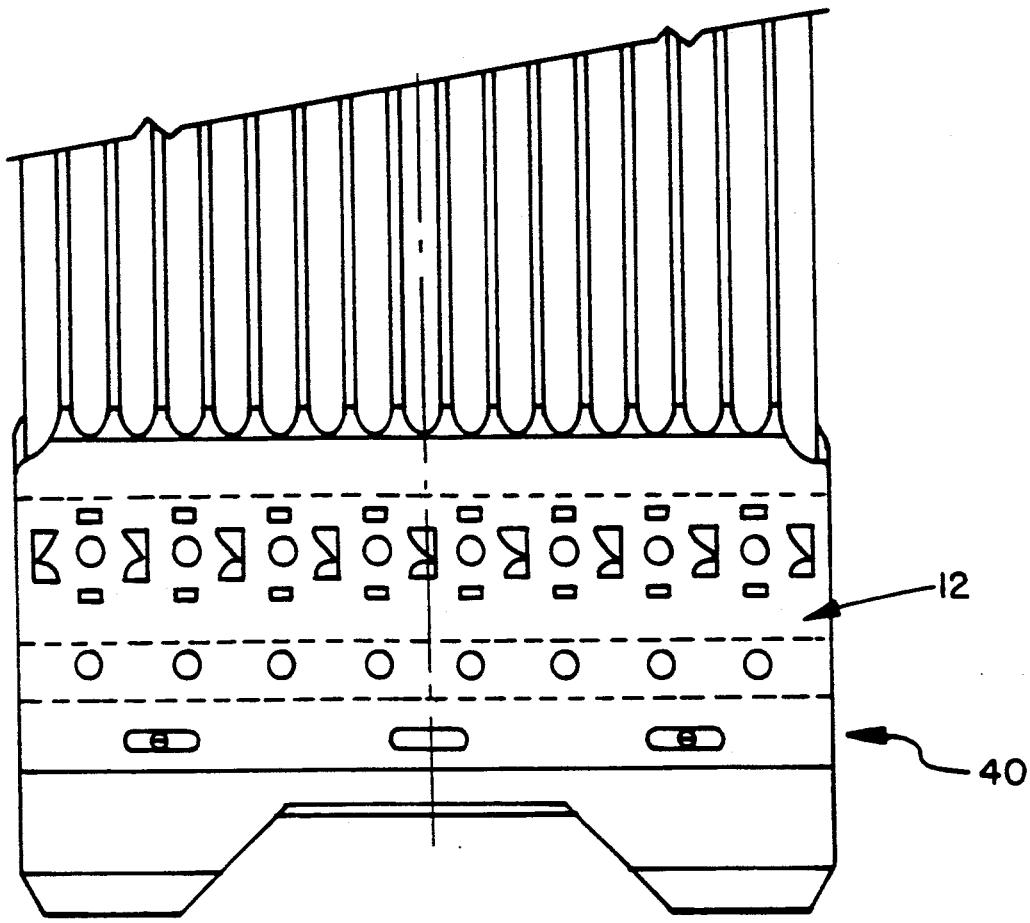
Figure 14:
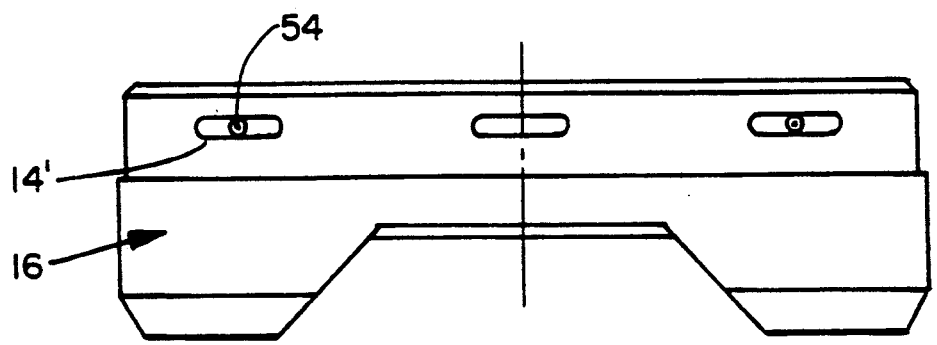
Figure 15:
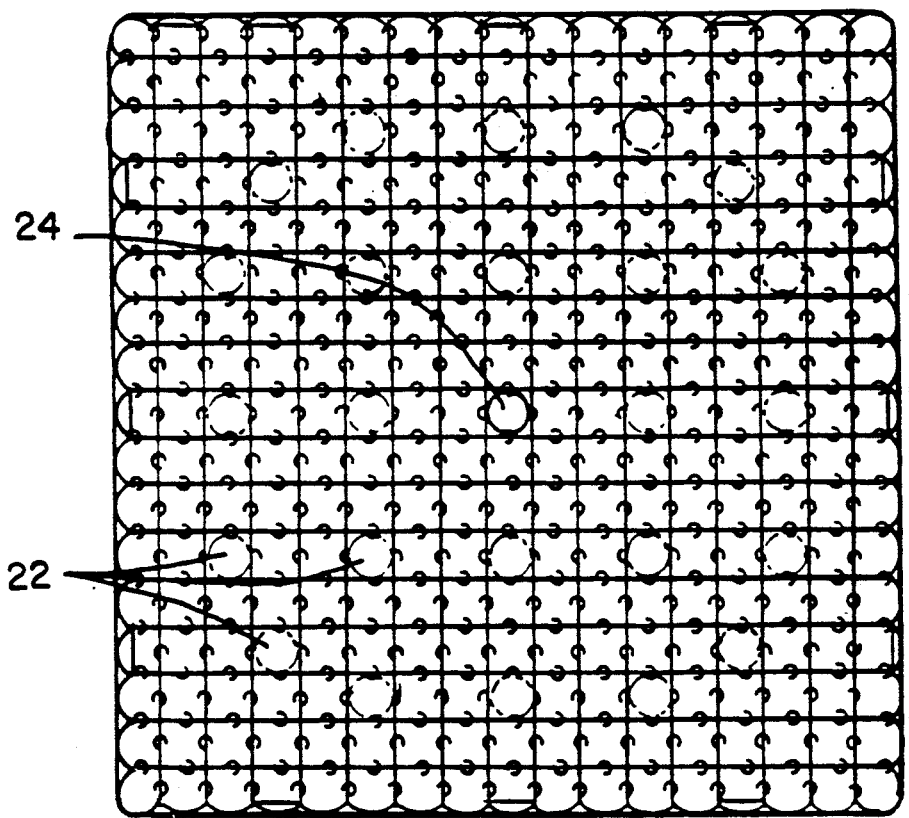
Figure 16:
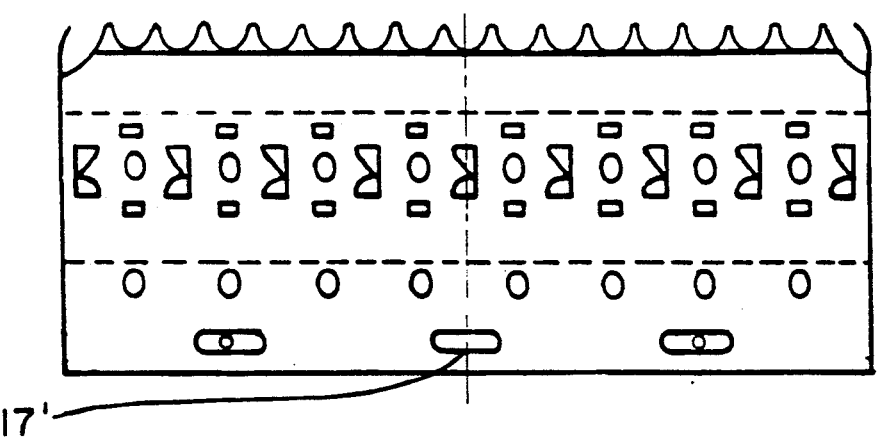
Figure 17:
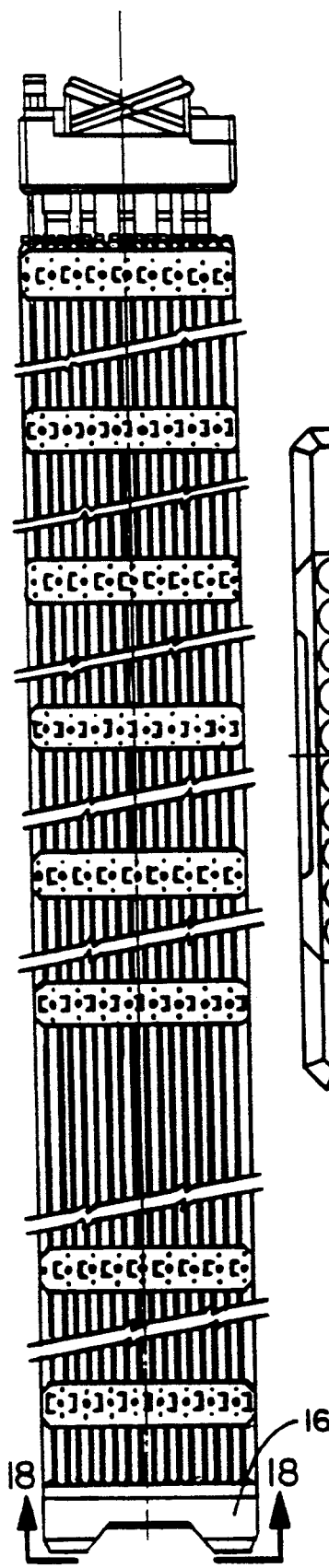
FIG. 17 is an overall elevational view of a fuel assembly utilizing the invention.
Figure 18:
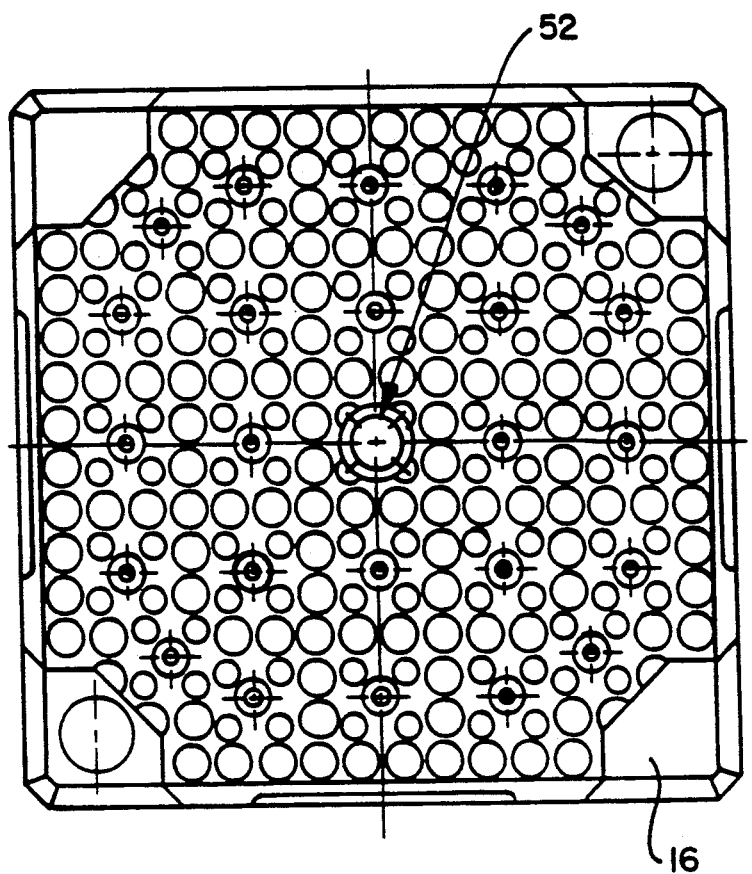
FIG. 18 is a bottom view of the fuel assembly of FIG. 17.
Figures 19, 20:
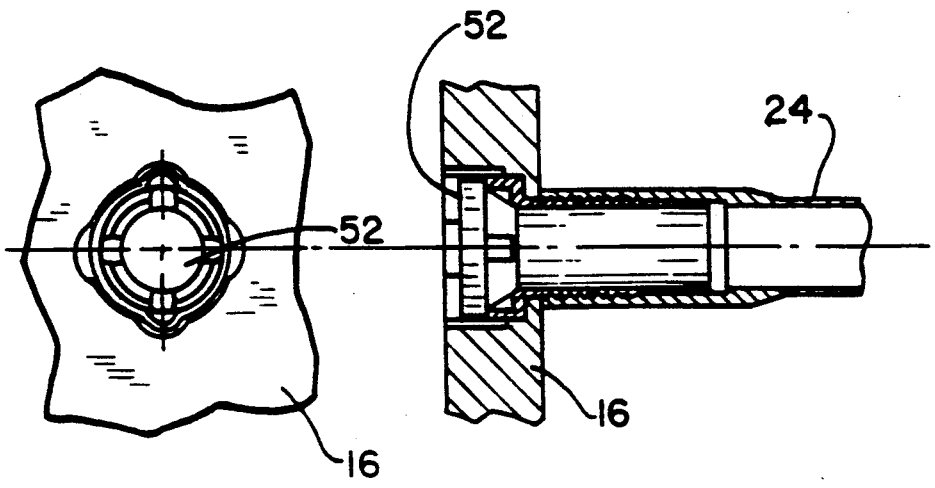
FIG. 19 is a detailed bottom view of instrumentation tube screw 52.
FIG. 20 is a cross-sectional view of FIG. 19.
Figures 21, 22:
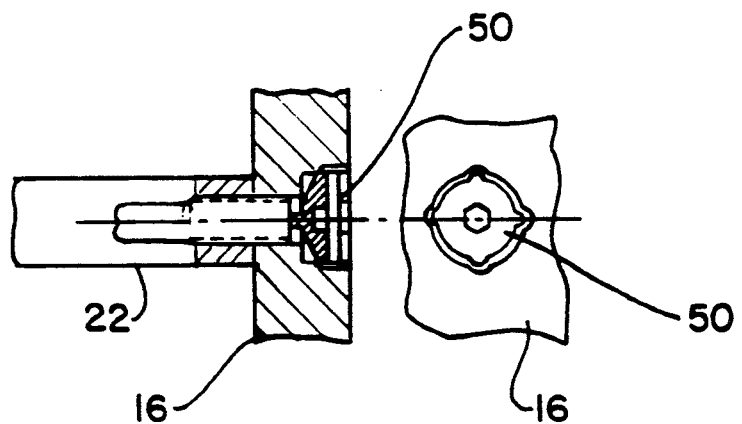
FIG. 21 is a cross-sectional view of a screw attaching end fitting 16 to a guide thimble.
FIG. 22 is a bottom view of the FIG. 21 connection.

Attachments 10 of FIGS. 1-4 and 20 of FIGS. 5-8 hold the lower grids 12 in place by the use of slots or grooves 14 in two or three sides of lower end fitting 16. These slots capture bent or ribbed sections 17 of the grid perimeter strip 18. The lower end fitting 16 is held in position by guide thimble locking screws 50 (FIGS. 21 and 22) which attach the lower end 16 fitting to the guide thimbles 22. These joints keep the lower end fitting 16 aligned with the rest of the fuel assembly and fixed to the guide thimble 22. This, in turn, prevents the lower end fitting 16 from sliding out of the attaching features.

To assemble, the lower grid 12 is first slid onto the fuel assembly guide thimbles 22. The instrumentation tube 24 (FIGS. 19 and 20) is then installed. The tube 24 uses a threaded joint with screw 52 shown in FIG. 20. Thimble tubes 22 make use of a threaded joint shown in FIG. 21. Once the instrumentation tube installation is complete, the lower end fitting 16 is slid across the assembly's face with the grid's lip or rib 17 interlocked in the lower end fitting's mating grooves 14. Once the end fitting 16 is captured by the lower grid's back lip or rib 17, guide thimble locking screws 50 and instrumentation screw 52 are installed preventing the lower grid 16 from sliding out of the groove 14. Fuel rods are then loaded. To remove and reinstall the lower end fitting 16 the same procedure would be used.

Attachments 30 and 40 hold the lower grid 16 in place by the use of slots or cutouts 14 (or 14') in all sides of the lower end fitting 16. These slots or cutouts 14 capture bent or stamped raised sections of the grid strip which mate with the slots or cutouts. The lower end fitting is held in position by guide thimble locking screws which attach the lower end fitting to the guide thimbles. These joints keep the lower end fitting aligned with the rest of the fuel assembly and fixed to the guide thimbles. Screws 54 can be added to increase the strength of the locking joint of the perimeter strip by sandwiching the perimeter strip in between the screws 54 and lower end fitting as shown in FIGS. 9 to 16. This obviously requires threaded holes or the like in the lower end fitting.

To assemble, the lower grid is first slid onto the fuel assembly guide thimbles and instrumentation tube. The lower end fitting is then slid on the instrumentation tube and guide thimble locking screws are installed. This attaches the lower end fitting to the guide thimbles. The lower grid 16 is then pressed downward and snapped into the lower end fitting groove or cutout. If additional perimeter locking screws 54 are used, they then would be installed. Fuel rods are then loaded. To remove and reinstall the lower end fitting, the same procedure would be used.

I claim:

1. In a fuel assembly for a nuclear reactor having a lower grid and a lower end fitting attached thereto, the improvement characterized by:

means on said lower grid to make a sliding attachment with the lower end fitting, and means on said lower end fitting to make a sliding attachment with said lower grid.

2. In a fuel assembly for a nuclear reactor having a lower grid and a lower end fitting attached thereto, the improvement characterized by:

means on said lower grid to make a snapping attachment with the lower end fitting, and means on said lower end fitting to make a snapping attachment with said lower grid.

3. The fuel assembly of claim 2 in which locking screws complete the attachment.

* * * * *